July 17, 1934.  W. H. KIMPTON  1,966,952
CHANGE SPEED GEARING
Filed April 23, 1932  2 Sheets-Sheet 1
FIG_1_
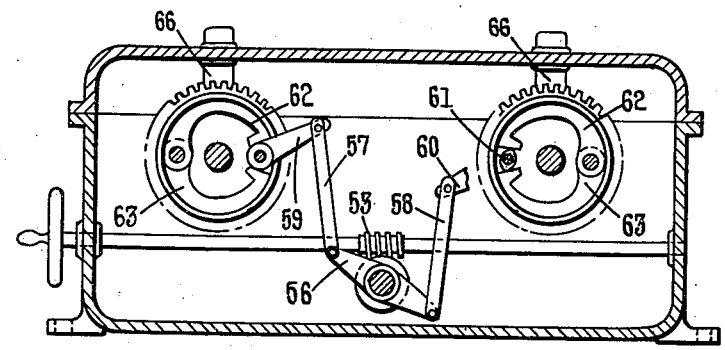
FIG_2_
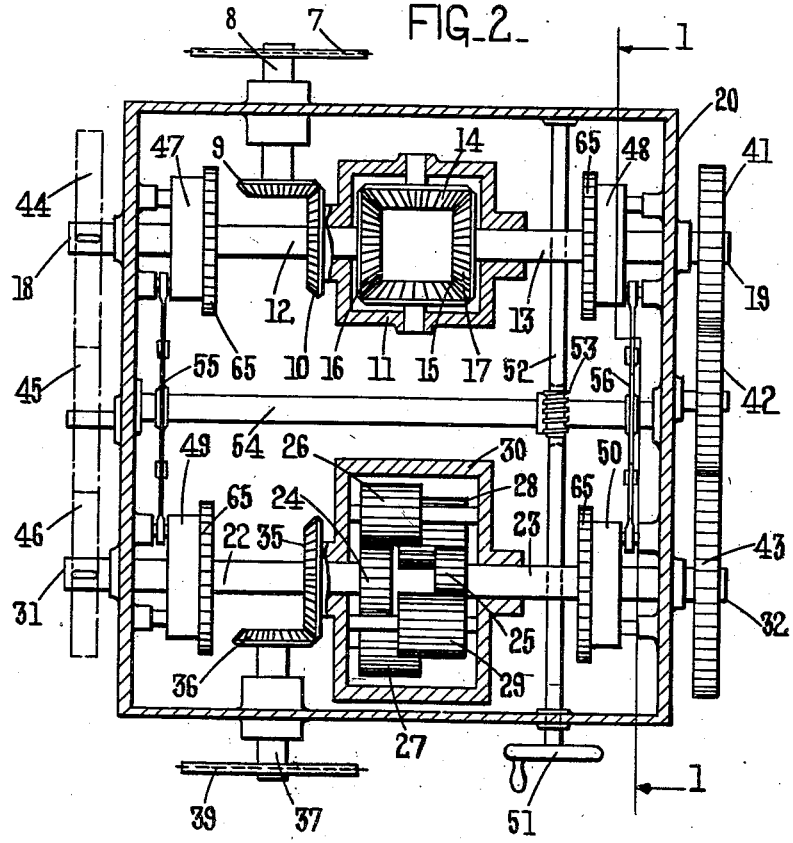
WILLIAM H. KIMPTON
INVENTOR
ATTORNEYS July 17, 1934.  W. H. KIMPTON  1,966,952
CHANGE SPEED GEARING
Filed April 23, 1932   2 Sheets-Sheet 2
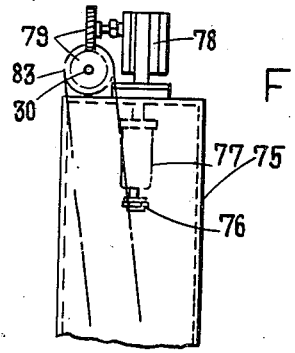
FIG 4
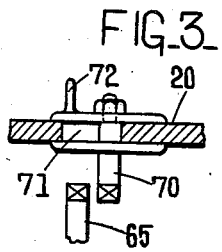
FIG. 3
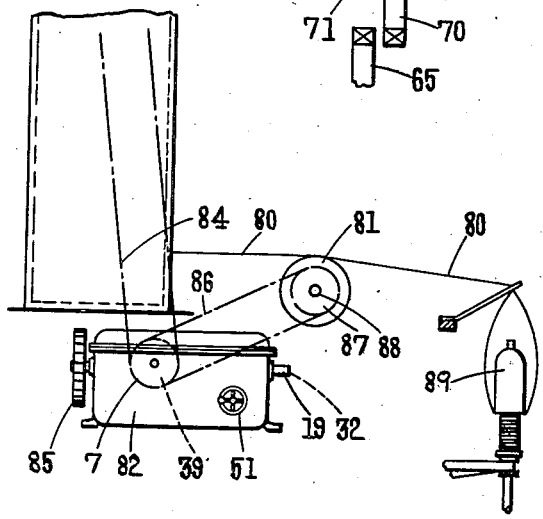
FIG. 5
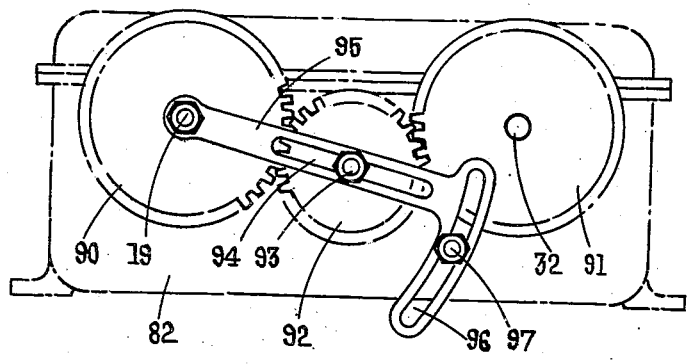
WILLIAM H. KIMPTON
INVENTOR
ATTORNEYS Patented July 17, 1934

1,966,952

UNITED STATES PATENT OFFICE 1,966,952

CHANGE SPEED GEARING

William Harry Kimpton, Spondon, near Derby, England, assignor to Celanese Corporation of America, a corporation of Delaware Application April 23, 1932, Serial No. 607,127
In Great Britain May 4, 1931

6 Claims. (Cl. 74—34)

This invention relates to change-speed gearing, the primary object of the invention being to provide gearing in which a change of gears can be effected without arresting the drive through the gearing. Further objects are to provide a gearing giving a large number of gear ratios, and a positive drive whatever the ratio.

The change-speed gear according to the invention embodies two differential mechanisms which are adapted to be connected to each other in series by two sets of gearing affording alternative drives between the differential mechanisms, and a pair of brakes by which the parts of the differential mechanisms connected to one of the gear trains can be locked to enable that gear train to be put out of operation while gears in the train are removed and replaced, the drive imparted to one differential mechanism continuing to be transmitted to the other meanwhile. In this way, any desired gear ratio can be brought into operation. Both sets of connecting gearing may include interchangeable gears, brakes in connection with the other set enabling either set of gears to be removed and replaced at will. If desired, both gear trains may operate simultaneously, the resultant driving ratio being that due to the differential action of the two trains.

As an example of the application of the invention may be mentioned the driving of machines for spinning artificial filaments or the like, in which the pump speeds, for example, are changed in order to produce a change in the denier of the filaments or the like. By the use of the invention, a change of speed can be effected without stopping the spinning operation, so that production of the filaments or the like can continue without interruption, thus diminishing to a very great degree the amount of time required to make a denier change. Further, the large number of positive gear ratios which can be employed renders the gear particularly useful for experimental work on such spinning machines.

The invention will now be described with reference to the accompanying drawings which show one form of gear box in diagrammatic form.

In the accompanying drawings Figure 1 is an elevation in section on the line 1—1 of Figure 2, and Figure 2 is a plan view in section of the differential mechanism according to the invention.

Figure 3 shows a detail of the mechanism shown in Figures 1 and 2.

Figure 4 is a side elevation of the differential mechanism according to the invention as applied to an apparatus for the dry spinning of artificial filaments, and Figure 5 is a side elevation of the differential mechanism showing a method of securing different external gear trains.

Referring to Figures 1 and 2, power is supplied to the gear box by means of a sprocket 7 mounted on a shaft 8 which carries a bevel wheel 9. The bevel wheel 9 meshes with the bevel wheel 10 secured to the frame 11 which is rotatable on the shafts 12, 13. The frame 11 carries a pair of freely rotatable bevel wheels 14, 15 meshing with bevel gears 16, 17 secured respectively to shafts 12, 13. The ends 18, 19 of the shafts 12, 13 project from the gear casing 20 and are adapted to receive interchangeable gears as will be described later.

A similar arrangement may be provided in connection with the further pair of shafts 22, 23 but in Figure 2 a different form of connection is shown between these shafts as an alternative to that shown between the shafts 12, 13. The shafts 22, 23 carry on their inner ends gears 24, 25 each meshing with a pair of gears 26, 27: 28, 29 respectively, the gears 26 to 29 being mounted in a casing 30 rotatable about the two shafts 22, 23. The gears 26 to 29 extend beyond the gears 24, 25 on the shafts 22, 23 and mesh with each other, the gear 26 meshing with the gear 28 and the gear 27 with the gear 29. The whole arrangement of gears 24–29 is an equivalent alternative of the bevel gears shown in connection with the shafts 12, 13. The ends 31, 32 of the shafts 22, 23 extend beyond the casing 20 as with the ends 18, 19 of the shafts 12, 13. The casing 30 carrying the gears 26–29 is connected with the bevel gear 35 meshing with a bevel gear 36 of the shaft 37 of the gear box which carries a sprocket 39. Connection is made by means of a train of gears 41, 42, 43, between the ends 19, 32 of the shafts 13, 23, and a similar train of gears 44, 45, 46 is shown in dotted lines between the ends 18, 31 of the shafts 12, 22.

Brake drums 47, 48, 49, 50 are provided on the shafts 12, 13, 22, 23 respectively, the brakes being controlled simultaneously from a wheel 51 rotating a shaft 52 carrying a worm 53, which in turn rotates a shaft 54 carrying levers 55, 56. The lever 56 as shown in Figure 1, is connected at each end by links 57, 58 to levers 59, 60 operating cams, one of which is shown at 61, which work the internally expanding brake shoes 62, 63. The braking arrangement described above are so disposed that by the rotation of the wheel 51 the brakes 48, 50 are operated simultaneously to release the shafts 13, 23, while the brakes 47, 49 are operated by the lever 55 to brake the shafts 12, 22 or vice versa. In an intermediate position, both brakes are off. In addition, gears 65 are provided in connection with each of the brake drums 47 to 50 and a locking device 66, to be described hereafter, is provided in connection with such gears in order to lock the drums positively when desired. Instead of internally expanding shoes, any other form of braking may be used, e. g. a band brake, or a brake in the form of a friction clutch adapted to secure the shaft to which it is applied to the stationary casing 20 of the differential gear.

In Figure 2 the brakes 47, 49 are assumed to be in the "on" position and the drive is transmitted from the shaft 7 to the shaft 13 from the bevel gears 9 and 10 by the rotation of the casing 11 and the bevel gears 14, 15. The bevel 16 being stationary the bevel gear 17 and the shaft 13 are caused to rotate. The drive is transmitted from the shaft 13 through the gears 41, 42, 43 to the shaft 23 carrying the gear 25 which rotates the gears 28, 29 and 26, 27. Since the gear 24 is stationary the rotation of the gears 26 to 29 causes the casing 30 and the bevel gear 35 to rotate thereby driving the bevel gear 36 and the shaft 37. The speed ratio between the shafts 8 and 37 will depend upon the gears 41, 43. If it is desired to change the speed ratio, a further set of gears 44, 45, 46 is fitted to the ends 18, 31 of the stationary shafts 12, 22 and the wheel 51 is rotated in such a manner as to release the brakes 47, 49 and, simultaneously to apply the brakes 48, 50, so that the shafts 13, 23 are brought to rest and the drive is transmitted through the shafts 12, 22 in precisely the same manner as that described with reference to the shafts 13, 23. When it is desired to change the gear ratio again a new set of gears is fitted to the stationary ends 19, 32 and the drive is again transferred by the operation of the wheel 51 to the shafts 13, 23 as before.

In each of the gear trains 41, 42, 43; 44, 45, 46, an idler gear is included, with the result that the shafts 8, 37 are driven in the same direction. If it is desired to drive them in opposite directions, gears 41, 43, intermeshing without an idler, or with the interposition of two idlers in series may be used. It will be seen that if gear trains of equal ratio, one having an idler and the other not, are fitted to opposite sides of the gear box, and all brakes are released, no drive will take place. If however the gear ratios are slightly different, the shaft 37 will be driven at a slow speed, the wheel 51 being in the intermediate position.

In Figure 3 a detail of the arrangement shown diagrammatically at 66 of Figure 1 is illustrated. 65 is the edge of the gear wheel one of which is described with reference to Figures 1 and 2 as being attached to each of the brake drums 47 to 50. When the gear 65 is stationary under the action of the brake, a tooth or gear segment 70 arranged to slide in a slot 71 in the casing 20 of the differential mechanism is slid into engagement with the gear 65 by means of a small projection 72. In this manner the gear 65 may be positively locked in the stationary position thereby relieving the brakes 47, 49 or 48, 50 of the load of holding the shafts 12, 22 or 13, 23 in a stationary position.

In Figure 4 a differential mechanism is shown in connection with an apparatus for the dry spinning of artificial filaments. 75 is a spinning chamber containing a spinning jet 76 secured to a filter 77 which is provided with a spinning solution by means of a pump 78. The pump 78 is driven by means of skew gears 79 from a shaft 30. The speed at which the filaments are drawn away from the spinning jet 76 is determined however by the speed of a feed roller 81 mounted on a shaft 88 and adapted to forward the filaments 80 to a cap spinning device 89. The shaft 30 is driven from the feed roller shaft 88, the speed ratio between the pump 78 and the roller 81 being determined by a differential gear shown at 82 of the kind according to the invention, in combination of course with the constant gear ratio due to the other parts of the drive. The drive is taken to a sprocket 83 by means of a chain 84 from a sprocket 39 on the far side of the gear box 82, the sprocket 39 being driven through gears 85 on the left hand end of the gear box 82 from the sprocket 7 on the near side of the gear box 82. The sprocket 7 is connected by means of a chain 86 to a driving sprocket 87 mounted on a shaft 88 on which the roller 81 is driven. When it is desired to change the ratio between the speed of the pump 78 and the speed of the roller 81 a set of gears of the desired ratio is secured to shafts 19, 32 on the right hand side of the gear box 82 and the drive is transmitted from the gears 85 to the other side of the gear box 82 by the application of the brakes through the wheel 51.

The gears may comprise an idler gear as described with reference to Figures 1 and 2 and means for securing such a gear in position are shown in Figure 5. The speed ratio is of course determined by the ratio between the gears 90, 91 mounted on the ends 19 and 32 of the shafts inside the gear box 82. The gears 90 and 91 are connected together by means of an idler gear 92 on a stub shaft 93 secured in a slot 94 in a lever 95 which is pivoted to the shaft 19. The other end of the lever 95 carries a slot 96 secured by a nut 97 on the side of the gear box 82, the adjustment provided by the slots 94, 96 being such that any pairs of gears 90, 91 may be connected by an intermediate idler 92 of suitable size and position.

What I claim and desire to secure by Letters Patent is:—

1. A change-speed gear comprising in combination a differential gear having one driving member and two driven members, a second differential gear having two driving members and one driven member, two gear trains, at least one of which is variable, each connecting one of the driven members of the first differential gear to one of the driving members of the second differential gear, an immobilizing device at each end of at least the variable gear train, and actuating means for causing said devices to hold against rotation the driven and driving members connected by said gear train and so to permit of alteration of the gear train while power continues to be transmitted through the other gear train.

2. A change-speed gear comprising in combination a differential gear having one driving member and two driven members, a second differential gear having two driving members and one driven member, two removable gear trains each connecting one of the driven members of the first differential gear to one of the driving members of the second differential gear, a pair of immobilizing devices disposed one at each end of one of said gear trains and adapted, when actuated, to hold against rotation each of the two members connected by said gear train, a second pair of immobilizing devices similarly associated with the other gear train, and actuating means for each pair of immobilizing devices which, when operated, will enable the gear train associated with such pair to be removed and replaced by a different train while power continues to be transmitted through the other gear train.

3. A change-speed gear according to claim 2, comprising two pairs of brakes constituting said pairs of immobilizing devices, and actuating means for simultaneously applying one pair of brakes and releasing the other pair.

4. A change-speed gear according to claim 2, comprising two pairs of brakes constituting said pairs of immobilizing devices, and an abutment device associated with each brake for positively locking against rotation the member brought to rest thereby.

5. In apparatus for the production of artificial threads having a prime mover for operating the moving parts of a spinning device, a change speed gear for transmitting power from the prime mover to the spinning device, comprising a differential gear having one driving member and two driven members, a second differential gear having two driving members and one driven member, two gear trains, at least one of which is variable, each connecting one of the driven members of the first differential gear to one of the driving members of the second differential gear, two immobilizing devices, one at each end of one of said gear trains, and actuating means for causing said devices to hold against rotation the driven and driving members connected by said gear train and so to permit of alteration of the gear train while the spinning continues in operation by power transmitted through the other gear train.

6. In apparatus for the production of artificial filaments having a prime mover for operating a spinning pump, a change speed gear for transmitting power from said prime mover to said pump, comprising a differential gear having one driving member and two driven members, a second differential gear having two driving members and one driven member, two gear trains, at least one of which is variable, each connecting one of the driven members of the first differential gear to one of the driving members of the second differential gear, two immobilizing devices, one at each end of one of said gear trains, and actuating means for causing said devices to hold against rotation the driven and driving members connected by said gear train and so to permit of alteration of the gear train while power continues to be transmitted through the other gear train to maintain extrusion of a spinning solution through a spinning jet.

WILLIAM HARRY KIMPTON.